United States Patent
Lee

(10) Patent No.: US 9,867,047 B2
(45) Date of Patent: Jan. 9, 2018

(54) METHOD AND APPARTUS FOR NOTIFYING AUTHENTICITY INFORMATION OF CALLER IDENTITY IN WIRELESS ACCESS SYSTEM

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,776

(22) PCT Filed: Aug. 7, 2015

(86) PCT No.: PCT/KR2015/008286
§ 371 (c)(1),
(2) Date: Feb. 8, 2017

(87) PCT Pub. No.: WO2016/021978
PCT Pub. Date: Feb. 11, 2016

(65) Prior Publication Data
US 2017/0238177 A1 Aug. 17, 2017

Related U.S. Application Data

(60) Provisional application No. 62/034,778, filed on Aug. 8, 2014.

(51) Int. Cl.
*H04M 1/66* (2006.01)
*H04W 12/06* (2009.01)
(Continued)

(52) U.S. Cl.
CPC ....... *H04W 12/06* (2013.01); *H04M 3/42059* (2013.01); *H04M 7/0078* (2013.01);
(Continued)

(58) Field of Classification Search
CPC ............. H04W 12/06; H04M 3/42059; H04M 2203/6027
(Continued)

(56) References Cited

U.S. PATENT DOCUMENTS

2003/0105960 A1* 6/2003 Takatori ................. G06F 21/33
713/168
2006/0121880 A1* 6/2006 Cowsar ................. H04M 3/382
455/406
(Continued)

FOREIGN PATENT DOCUMENTS

WO 2010010060 1/2010

OTHER PUBLICATIONS

PCT International Application No. PCT/KR2015/008286, Notification of Transmittal of the International Search Report and the Written Opinion of the International Searching Authority, or Declaration dated Nov. 23, 2015, 12 pages.

*Primary Examiner* — Nghi H Ly
(74) *Attorney, Agent, or Firm* — Lee, Hong, Degerman, Kang & Waimey

(57) ABSTRACT

The present invention relates to a wireless access system, and more particularly, to methods and apparatus for notifying authenticity information of a caller identifier (ID) in a wireless access system, comprising: receiving, from a second network node, a first call message including a caller ID of a second UE (UE2), determining whether the caller ID of UE2 has been authenticated or not by detecting a trust level of authenticity information in the first call message, and transmitting, to a first UE (UE1), a second call message including the caller ID and an indication message indicating one or authentication levels out of an authenticated, a spoofed, or an unauthenticated level, wherein the authenticated indicates the caller ID is authenticity and the spoofed (Continued)

indicates the caller ID is not guaranteed to correspond to the UE2.

12 Claims, 7 Drawing Sheets

(51) Int. Cl.
    *H04M 3/42*           (2006.01)
    *H04M 7/00*           (2006.01)
    *H04W 12/12*         (2009.01)

(52) U.S. Cl.
    CPC .... *H04W 12/12* (2013.01); *H04M 2203/6027* (2013.01); *H04M 2203/6045* (2013.01)

(58) Field of Classification Search
    USPC .................. 455/411, 410, 414.1, 422.1, 445
    See application file for complete search history.

(56) References Cited

U.S. PATENT DOCUMENTS

| | | |
|---|---|---|
| 2006/0167871 A1 | 7/2006 | Sorenson et al. |
| 2007/0121596 A1 | 5/2007 | Kurapati et al. |
| 2008/0280594 A1* | 11/2008 | Voyer ................ H04W 36/0055 455/412.1 |
| 2010/0122333 A1 | 5/2010 | Noe |
| 2011/0211572 A1 | 9/2011 | Campion et al. |
| 2014/0109204 A1* | 4/2014 | Papillon ................ H04L 9/3215 726/5 |

\* cited by examiner (a) Control-Plane Protocol Stack (b) User-Plane Protocol Stack (a)

(b)

METHOD AND APPARTUS FOR NOTIFYING AUTHENTICITY INFORMATION OF CALLER IDENTITY IN WIRELESS ACCESS SYSTEM

CROSS-REFERENCE TO RELATED APPLICATIONS

This application is the National Stage filing under 35 U.S.C. 371 of International Application No. PCT/KR2015/008286, filed on Aug. 7, 2015, which claims the benefit of U.S. Provisional Application No. 62/034,778, filed on Aug. 8, 2014, the contents of which are all hereby incorporated by reference herein in their entirety.

TECHNICAL FIELD

The present invention relates to a wireless access system, and more particularly, to methods and apparatus for notifying a trust level of authenticity information of caller identity.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

Regarding to a network security, a spoofing attack is a situation in which one person or program successfully masquerades as another by falsifying data and thereby gaining an illegitimate advantage.

As one of kinds of the spoofing attack, a caller identifier (ID) spoofing exists. That is, public telephone networks often provide caller ID information, which includes the caller's name and number, with each call. However, some technologies (especially in Voice over IP (VoIP) networks) allow callers to forge Caller ID information and present false names and numbers. Gateways between networks that allow such spoofing and other public networks then forward that false information. Since spoofed calls can originate from other countries, the laws in the receiver's country may not apply to the caller. This limits laws' effectiveness against the use of spoofed Caller ID information to further a scam.

DETAILED DESCRIPTION OF THE INVENTION

Technical Problems

To solve the problems described above, there is a need to notify of authentication information of caller identity to a callee. The authentication information is multiple-level of trust information: for example, it is (1) fully authenticated caller ID with the caller ID integrity-protected, (2) authenticated caller ID with no caller ID integrity-protected or caller ID spoofed (i.e., negatively authenticated caller ID), or (3) not authenticated caller ID.

Accordingly, the object of the present invention is to provide methods and apparatuses for preventing from spoofing by an unknown user.

Another object of the present invention is to define a new service for handling calls identified by caller information that is either not authenticated or not authorized to be used by the caller.

Still another object of the present invention is to identify which existing 3GPP supplemental services would interact with handling spoofed calls.

Still another object of the present invention is to provide a user equipment (UE) and/or a base station apparatus for supporting the above-described methods.

Technical problems to be solved by the present invention are not limited to the above-mentioned technical problem, and other technical problems not mentioned above can be clearly understood by one skilled in the art from the following description.

Technical Solutions

The present invention relates to a method and apparatus for notifying a trust level of authenticity information of caller identity to the callee.

In one aspect of the present invention, a method for notifying authenticity information of a caller identifier (ID) in a wireless access system, the method performed by a first network node and comprises steps of receiving, from a second network node, a first call message including a caller ID of a second UE (UE2); determining whether the caller ID of UE2 has been authenticated or not by detecting authentication information in the first call message; and transmitting, to a first UE (UE1), a second cell message including the caller ID and an indication message indicating one of authentication levels out of an authenticated, a spoofed, or an unauthenticated level, wherein the authenticated indicates the caller ID is authenticity and the spoofed indicates the caller ID is not guaranteed to correspond to the UE2.

In another aspect of the present invention, an apparatus for notifying authenticity information of a caller identifier (ID) in a wireless access system, the apparatus comprises a receiver; a transmitter; and a processor supporting the notifying authenticity information. Wherein the processor is configured to receive, via the receiver from a second network node, a first call message including a caller ID of a second UE (UE2); determine whether the caller ID of UE2 has been authenticated or not by detecting authentication information in the first call message; and transmit, via the transmitter to a first UE (UE1), a second cell message including the caller ID and an indication message indicating one of authentication levels out of an authenticated, a spoofed, or an unauthenticated level, wherein the authenticated indicates the caller ID is authenticity and the spoofed indicates the caller ID is not guaranteed to correspond to the UE2.

The caller ID may be a Mobile Station International Subscriber Directory Number (MSISDN) or the caller ID is information representing what is the UE2.

The indication message may be set to the unauthenticated level when the authenticity information has not been detected or the caller ID is not guaranteed to correspond to the UE2.

The level of the authenticated or the spoofed may be selected according to the detected authenticity information with a trust level.

The authenticity information may be derived by comparing an UE ID with the caller ID of the UE2.

The authenticity information may indicate multiple level of trust information as one of (1) fully authenticated caller ID with a caller ID integrity protected, (2) authenticated caller ID with no caller ID integrity protected, or (3) not authenticated caller ID.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, the present inventions are able to notify the authenticity information with a trust level.

Second of all, according to the new services for handling calls, the spoofing can be prohibited.

In addition, by providing the authenticity information, unexpected damages occurred by intruder can be banned.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
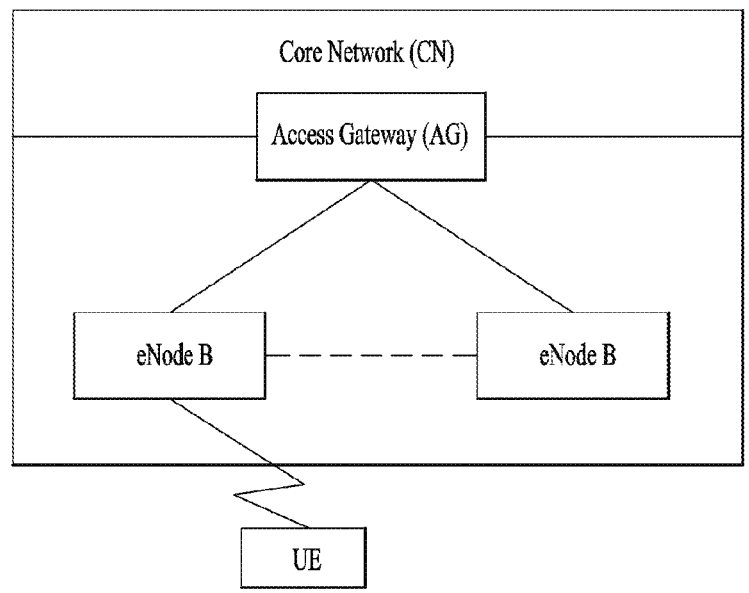
FIG. 1 illustrates a schematic structure a network structure of an evolved universal mobile telecommunication system (E-UMTS)

Exemplary embodiments of the present invention provide a method and apparatus for notifying authenticity information of caller identity.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.898, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
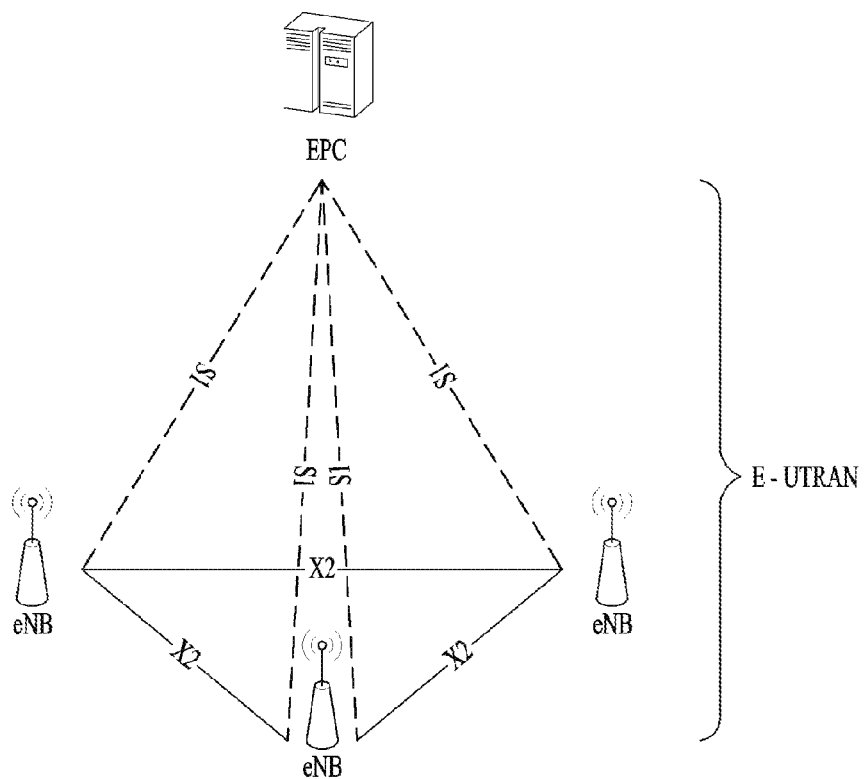
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
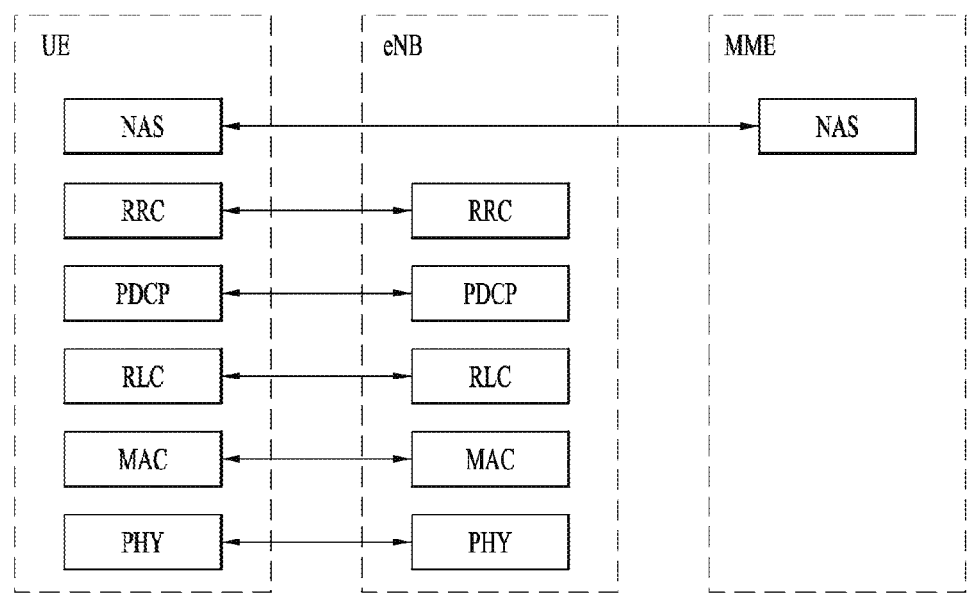
FIG. 3 illustrates the configurations of a radio interface protocol between the E-UTRAN and a UE.
Figure 3:
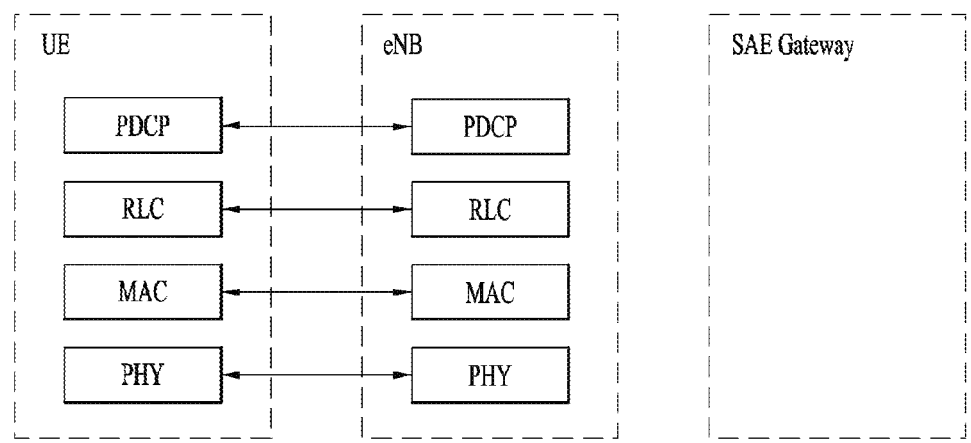

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Location Registration

A Public Land Mobile Network (PLMN) is a network established and operated by an Administration or a RPOA (Recognized Private Operating Agency) for the specific purpose of providing land mobile communication services to the public. The PLMN provides communication possibilities for mobile users. For communication between mobile and fixed users, interworking with a fixed network is necessary. Therefore, PLMNs shall provide a location registration function with the main purpose of providing continuity of service to UEs over the whole system area. The location registration function shall be such as to allow:

Fixed subscribers to call a UE by only using the directory number of the UE irrespective of where the UE is located in the system area at the time of the call.

UEs to access the system irrespective of the location of the UE.

UEs to identify when a change in location area has taken place in order to initiate automatic location updating procedures.

2. User Control Over Spoofed Calls

Spoofing or malicious modification of caller information to hide the real caller identity provided by such capabilities as Calling Line Identification and Caller Name (Caller ID) is growing into a significant problem in many countries. The complaints to authorities and PLMN operators regarding these spoofed calls range from nuisance calls, violations of various phone solicitation rules (such as the US Federal Trade Commission's Telemarketing Sales Rules) to being used as a platform for significant fraud, identity theft and social engineering. Various malicious uses of caller information spoofing include these categories: swatting, vishing (voice phishing), smishing (SMS phishing), and TDOS (Telephony Denial-of-service).

There are several SDOs dealing with creating the ability to detect caller information spoofing within call setup signaling including IETF's Stir working group, 3GPP's SA3 and ATIS's PTSC CSEC. However their focus is to define automated mechanisms to identify whether the caller information is authentic and the caller is authorized to use the presented caller information. What can be done with the calls where the caller information is determined to be unauthorized or unauthentic is not addressed in these activities.

There is a need to consider defining a new service for handling calls identified by caller information that is either not authenticated or not authorized to be used by the caller. Likewise there is a need to identify which existing 3GPP supplemental services would interact with handling spoofed calls.

2.1 User Identifiers

In LTE/LTE-A system, different IDs are used to identify each entity depending on their relationship with other IDs. For example, LTE/LTE-A systems define user equipment identifiers (UE IDs), such as IMSI (International Mobile Subscriber Identity), GUTI (Globally Unique Temporary UE Identity), S-TMSI (SAE Temporary Mobile Subscriber Identity), IP (Internet Protocol) address, and/or C-RNTI (Cell-Radio Network Temporary Identity) used for identifying the UE. Hereinafter, the UE IDs which can be used in the embodiments of the present application will be explained in detail.

The IMSI is a unique number associated with each mobile phone user. It is stored in the SIM inside the phone and is sent by the phone to the network. It is primarily intended for obtaining information on the use of the PLMN by subscribers. It is also used for other functions such as to compute the Paging Occasions (PO) in LTE/LTE-A system.

Figure 4:
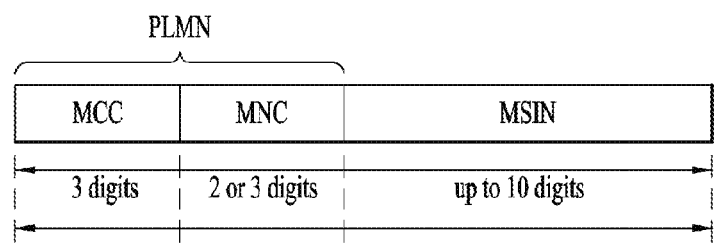
FIG. 4 illustrates contractures of the IMSI and the GUTI.
Figure 4:
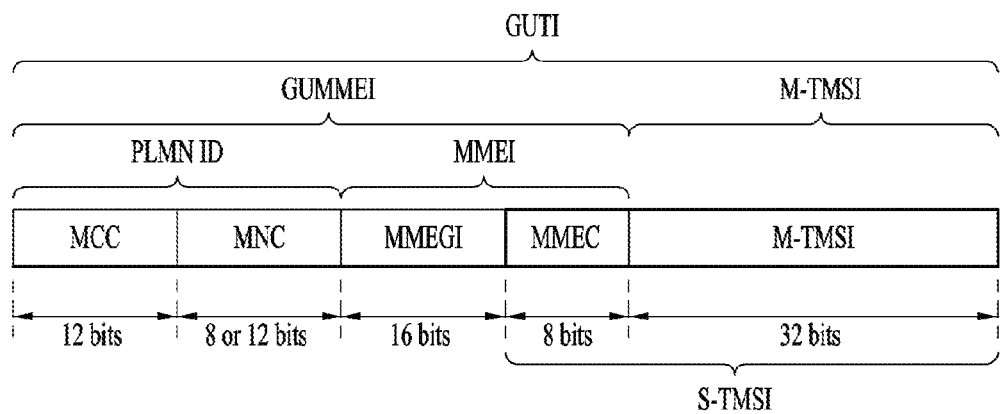

In this case, the IMSI is composed of two parts, PLMN ID and MSIN (Mobile Subscriber Identification Number), as shown in FIG. 4. FIG. 4 illustrates contractures of the IMSI and the GUTI.

Referring to FIG. 4(a), a PLMN ID is an ID that globally identifies a mobile operator (e.g. combination of a MCC (Mobile Country Code) and a MNC (Mobile Network Code)). The MSIN is a unique ID that identifies a mobile subscriber within a mobile operator. When a user subscribes to a mobile network (e.g., the LTE/LTE-A systems), the user gets a device and a USIM card (or a SIM card) that has an IMSI in it. By then, the LTE network should already have the same IMSI registered as well. IMSIs are stored in an HSS (Home Subscriber Server) and an SPR which are the LTE entities.

In the HSS, a key to be used along with the IMSI in authenticating subscribers, and QoS profile to be used by the user are stored. So, when users attempt to access (i.e. who send Attach Request message) to the network, the HSS (the MME on behalf of the HSS, to be accurate. See LTE Authentication for further explanation) denies the users with an unregistered IMSI, but allows ones with a valid registered IMSI by delivering authentication information and QoS profile to the MME.

Referring to FIG. 4(b), the GUTI is an unambiguous identification of the UE that does not reveal the UE or the user's permanent identity in the EPS. It also allows the identification of the MME and network. It can be used by the network and the UE to establish the UE's identity during signaling between them in the EPS.

The IMSI is one of the most important parameters that identify a subscriber. So, if it is exposed over radio link, serious security problem can be caused. So, to keep an IMSI secure, an alternate value that a subscriber (e.g., the UE) can use instead of the IMSI (whenever possible) to access the LTE network was needed. That is why GUTI is used. Unlike an IMSI, a GUTI is not permanent and is changed into a new value whenever generated.

When a UE initially attaches to an LTE network (e.g. turning on the UE), it sends its IMSI to the network for authentication to have itself identified. In other words, it uses the IMSI as its ID. Once connection is established (i.e. once successfully authenticated), the network (e.g., the MME) delivers a GUTI value through an Attach Accept message to the UE, which then remembers the value to use it as its ID instead of the IMSI when it re-attaches to the network (i.e., when it is turned off and then on again later).

Referring back to FIG. 4(b), the GUTI consists of the GUMMEI (Globally Unique Mobility Management Entity Identifier) and the M-TMSI (M Temporary Mobile Subscriber Identity). The GUMMEI is used to identify the MME uniquely in global. The GUMMEI consists of a PLMN identity, an MMEGI (MME Group Identity) and an MMEC (MME Code). The MME code is used in the eNodeB by the NAS node selection function to select the MME. In addition, the M-TMSI is a temporary identity used to preserve subscriber confidentiality. It identifies a user between the UE and the MME. The relationship between M-TMSI and the IMSI is known only in the UE and in the MME.

The S-TMSI (System Architecture Evolution-Temporary Mobile Subscriber Identity) is a unique identifier assigned to the UE by the MME in order to identify the UE context while supporting subscriber identity confidentiality. Referring to FIG. 4(b), the S-TMSI consists of MMEC and the M-TMSI.

As one of the UE IDs, the IP address, also called as a "PDN (Packet Data Network) address" is allocated by an LTE network to a UE in order for the UE to connect to a PDN (i.e., an IP network) when the UE initially attaches to the LTE network. Because a UE can be connected to more than one PDN through an LTE network depending on the services, the LTE network allocates each UE a different IP address per each PDN the UE is connected to. These IP addresses (PDN addresses) are used to identify the UE from/to which an IP packet is sent when the IP packet is forwarded from an LTE network to a PDN, or received from a PDN.

The C-RNTI is allocated to a UE by an eNB through a random access procedure in a cell controlled by the eNB and is effective only within the serving cell. UEs in the cell are uniquely identified by their C-RNTI. A new C-RNTI is allocated when the UE leaves the current cell and moves to a new cell through a random access procedure.

2.2 Caller ID

A Caller ID (caller identification) which is used in embodiment of the present invention can be also called a calling line identification (CLID), a calling number delivery (CND), a calling number identification (CNID), a calling line identification presentation (CLIP) or a Mobile Station International Subscriber Directory Number (MSISDN). The caller ID is used in a telephone service, available in analog and digital phone systems and most voice over Internet Protocol (VoIP) applications.

In the telephone service, it transmits a caller's number to the called party's telephone equipment (e.g., user equipment) during the ringing signal, or when the call is being set up but before the call is answered. Where available, caller ID can also provide a name associated with the calling telephone number. This service is called a Calling Name Delivery Service (CNAM). The information made available to the called party may be displayed on a telephone's display, on a separately attached device, or personal computer.

The caller ID may be used by the recipient to avoid answering unwanted incoming calls by the concept of informed consent; however, it also poses problems for personal privacy. The possibility of caller ID spoofing may render received information unreliable.

In 3GPP system studies FS_UC_SPOOF (Feasibility study for User control on Spoofed calls) cases. At this time, there are three types of use cases studied so far. However, there are some cases that can create confusion for the user who is receiving an incoming call, regarding whether the caller ID is delivered after it is authenticated or not.

In this document, the meaning of authentication procedure includes verifying the caller ID is spoofed or not. Hereinafter, embodiments of the present invention providing a caller ID authenticity will be described.

3. Methods for Notifying Authenticated Status of Caller ID

In providing the authenticity of a caller ID to a callee (who receives the call), the caller's network may have two possibilities: (1) being capable of providing authenticity or (2) not being capable.

When the caller's network is not capable of providing authenticity of the caller's ID, the callee has confusion about the received caller ID information whether it is not spoofed ID (i.e., authenticated one) or it is a spoof caller ID provided by non-authenticating network. Therefore, it is not enough to provide an indication that the caller's ID is authenticated.

Accordingly, the embodiments of the present application provide methods for notifying authenticity information of an incoming call from another network.

Figure 5:
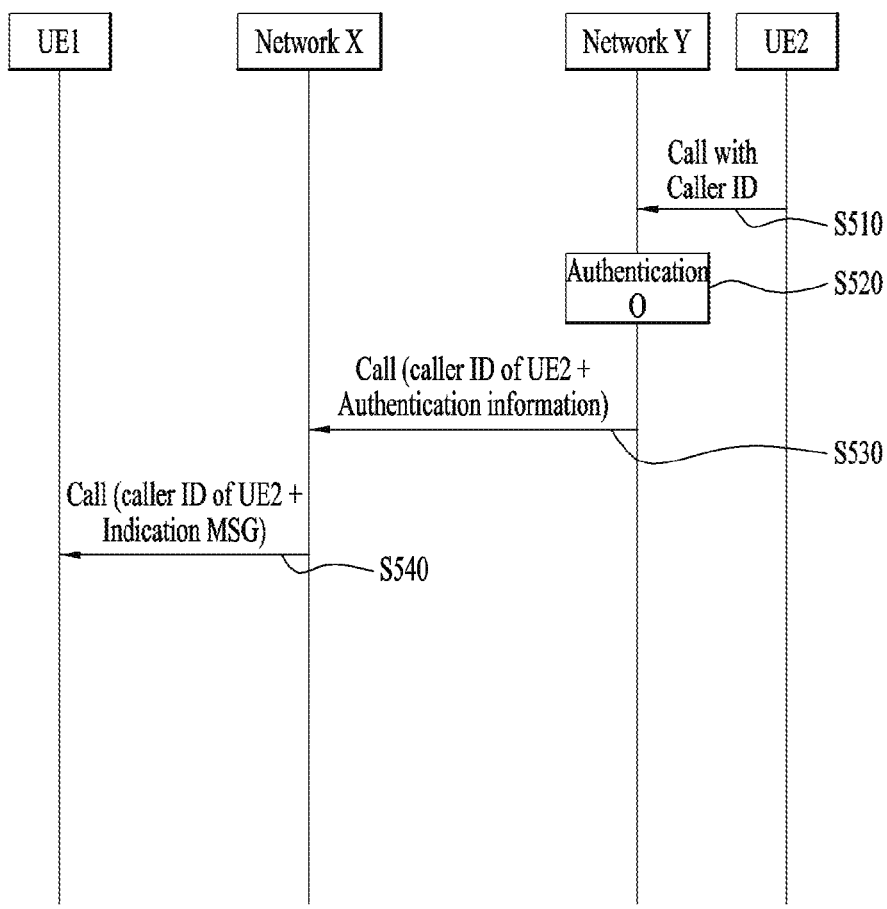
FIG. 5 illustrating a method for notifying a trust level of authenticity information of an incoming call.

FIG. 5 illustrating a method for notifying a trust level of authenticity information of an incoming call.

It is assumed that the Network X is a PLMN which employs automated spoofed call detection and the Network Y is a PLMN which employs automated spoofed call detection. In this case, each of the Network X and the Network Y includes one or more evolved Node B (eNB) and one or more user equipment (UE). In addition, the Network X can be referred to a first network and the Network Y can be referred to a second network.

Alice is a user of the UE1 which has been subscribed in the Network X. Bob is a user of the UE2 which has been subscribed in the Network Y. In this case, Bob wishes to call to Alice which is in the different network or different country. So, the UE2 of Bob attempts to call Alice with a Bob's caller ID through the Network Y. The caller ID can be the MSISDN that is a telephone number of the UE2 (S510).

The Network Y performs an authentication procedure based on the caller ID of Bob. In this case, the UE2 has been already subscribed in the Network Y, so the Network Y has identification information of the UE2. Accordingly, Network Y is able to authenticate whether the caller ID is authentic or not by comparing the identification information and the caller ID of the UE2. In this case, the identification information of the UE2 can be one or combination of UE IDs described in section 2.1 (S520).

During the authentication procedure, the Network Y may authenticate whether the incoming call is spoofed or not by comparing the UE ID with the caller ID. So, if the caller ID is not matched with the UE ID, the Network Y decides the call has been spoofed. On the other hand, if the caller ID is matched with the UE ID, the Network Y decides the call has authenticity.

After the authentication procedure was performed, the Network Y transfers the call message from the UE2 to the UE1 of Alice in the Network X. In this case, the Network Y also notifies the authentication information derived at the step S520 with the caller ID of the UE2. On the other words, the Network Y notifies the types/attributes of Bob's caller ID that will be released to Alice and/or Alice's Network for the purpose of providing the authenticity information (S530).

If the Network X has been received the call message, the Network X determines whether the caller ID of the UE2 has been authenticated or not by detecting the authenticity information in the call message.

After then, the network X delivers Bob's caller ID and an indication message indicating an authenticity level of Bob's caller ID. In this case, the indication message is able to indicate one of authenticity levels such as an authenticated, a spoofed or an unauthenticated (S540).

By receiving the indication message along with the caller ID of the UE2, the UE1 of Alice is able to recognize whether the call from the Bob is spoofed or not. In other aspect of the embodiments, if the indication message indicates the unauthenticated, the meaning of the unauthenticated is that the authenticity is not verified yet and authentication has not been provided to the incoming call from the other network.

In other aspect of the present invention, the authenticity information is able to indicate multiple-level of trust information: for example, it is (1) fully authenticated caller ID with the caller ID integrity-protected, (2) authenticated caller ID with no caller ID integrity-protected or caller ID spoofed (i.e., negatively authenticated caller ID), or (3) not authenticated caller ID. In this case, the Network X may configure the indication message based on the authenticity information.

Figure 6:
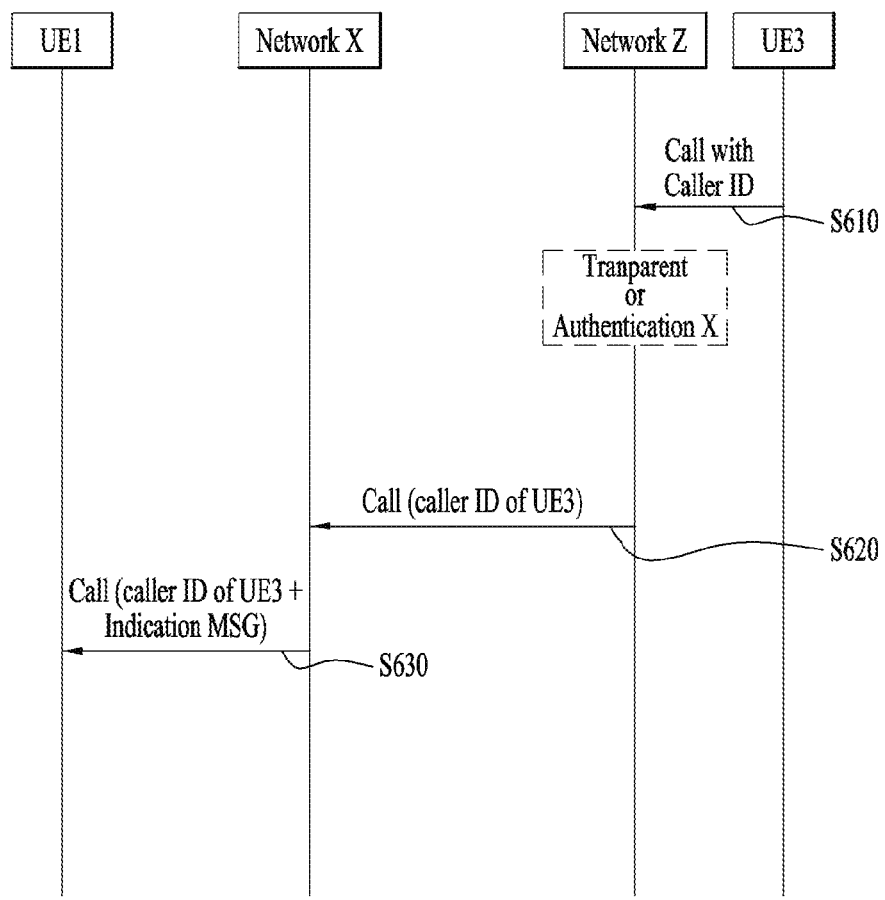
FIG. 6 illustrating another method for notifying a trust level of authenticity information of an incoming call.

FIG. 6 illustrating another method for notifying a trust level of authenticity information of an incoming call.

It is assumed that the Network X is a PLMN which employs automated spoofed call detection and the Network Z is a network which does not validate any subscriber's authenticity. In this case, each of the Network X and the Network Z includes one or more eNBs and one or more UEs. In addition, the Network X can be referred to a first network and the Network Z can be referred to a third network.

Alice is a user of the UE1 which has been subscribed in the Network X. Chloe is a user of the UE3 which has been subscribed in the Network Z. In this case, Chloe wishes to call to Alice which is in the different network or different country. So, the UE3 of Chloe attempts to call Alice with a Chloe's caller ID through the Network Z. The caller ID can be the MSISDN that is a telephone number of the UE3 (S610).

The Network Z does not perform an authentication procedure whether the caller ID of Chloe has been spoofed or not. So, the Network Z transparently transfers the call message which has been transmitted from the UE3 to the UE1 in the Network X. In this case, the Network Z dose not deliver the authenticity information of the UE3's identity to, or notifies that Chloe's identity is not authenticated to Alice's Network X (S620).

If the Network X has been received the call message, the Network X determines whether the caller ID of the UE3 has been authenticated or not.

In this case, the call message includes no authenticity information or notifies that the UE3's identify is not authenticated, the Network X delivers the call message along with the caller ID of the UE3 and an indication message (S640).

The indication message is able to indicate one of authenticity levels such as an authenticated, a spoofed or an unauthenticated, and the indication message. In this case, at the step S540, the indication message indicates the authenticity level of the unauthenticated.

By receiving the indication message along with the caller ID of the UE3, the UE1 of Alice cannot recognize whether the call from the Chloe is spoofed or not because the indication message indicates the unauthenticated. Therefore, the Alice has to check up the call is authentic or not by using other methods because the meaning of the unauthenticated is that the authenticity is not verified yet. In one simple option, the call from Chloe can be treated as the spoofed since it has not been verified.

As another aspect of the embodiments, the Network X employing automated spoofed call detection shall be able to consider an unidentified call message regarding caller ID authentication or an empty message (i.e., no message received) as un-authenticated caller ID.

In other aspect of the present invention, the indication message is able to indicate multiple-level of trust information: for example, it is (1) fully authenticated caller ID with the caller ID integrity-protected, (2) authenticated caller ID with no caller ID integrity-protected or caller ID spoofed (i.e., negatively authenticated caller ID), or (3) not authenticated caller ID.

Figure 7:
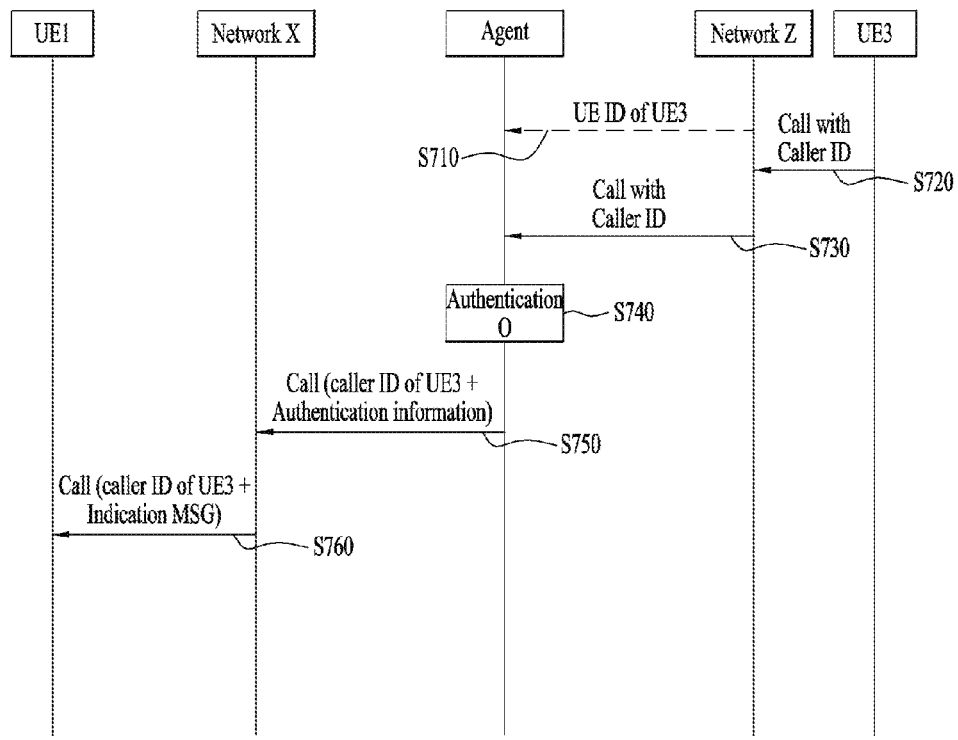
FIG. 7 illustrating still another method for notifying a trust level of authenticity information of an incoming call.

FIG. 7 illustrating still another method for notifying a trust level of authenticity information of an incoming call.

It is assumed that the Network X is a PLMN which employs automated spoofed call detection and the Network Z is a network which does not validate any subscriber's authenticity. In this case, each of the Network X and the Network Z includes one or more eNBs and one or more UEs. In addition, the network X can be referred to a first network and the network Z can be referred to a third network.

In FIG. 7, because the Network Z cannot support the automated spoofed call detection, the Agent which is one of the entities of the LTE/LTE-A system is defined to perform the authentication procedure instead of the Network Z. Accordingly, the Network Z previously has to provide the identification information of the UE 3 to the Agent before the call procedure will be occurred. The identification information of the UE 3 can be referred to the UE IDs described in section 2.1 (S710).

Alice is a user of the UE1 which has been subscribed in the Network X. Chloe is a user of the UE3 which has been subscribed in the Network Z. In this case, Chloe wishes to call to Alice which is in the different network or different country. So, the UE3 of Chloe attempts to call Alice with a Chloe's caller ID through the Network Z. The caller ID can be the MSISDN that is a telephone number of the UE3 (S720).

The Network Z does not perform an authentication procedure whether the caller ID of Chloe has been spoofed or not. So, the Network Z transparently transfers the call message with the caller ID, which has been transmitted from the UE3 to the Agent (S730).

The Agent performs an authentication procedure based on the caller ID of Chloe. In this case, the UE ID of the UE3 has been already shared with the Agent, the Agent has identification information (i.e., the UE ID) of the UE3. Accordingly, the Agent is able to authenticate whether the caller ID is authentic or spoofed by comparing the identification information with the caller ID of the UE3. In this case, the identification information of the UE3 can be one or combination of UE IDs described in section 2.1 (S740).

After the authentication procedure was performed, the Agent transfers the call message from the UE3 to the UE1 of Alice in the Network X. In this case, the Agent also notifies the authentication information derived at the step S740 with the caller ID of the UE3. On the other words, the Agent notifies the types/attributes of Chloe's caller ID that will be released to Alice and/or Alice's Network for the purpose of providing the authentication information (S750).

If the Network X has been received the call message, the Network X determines whether the caller ID of the UE3 has been authenticated or not by detecting the authentication information in the call message.

After then, the Network X delivers Chloe's caller ID and an indication message indicating an authenticity level of Chloe's caller ID. In this case, the indication message is able to indicate one of authenticity levels such as an authenticated, a spoofed or an unauthenticated (S760).

By receiving the indication message along with the caller ID of the UE3, the UE1 of Alice is able to recognize whether the call from the Chloe is spoofed or not.

In other aspect of the present invention, the authenticity information is able to indicate multiple-level of trust information: for example, it is (1) fully authenticated caller ID with the caller ID integrity-protected, (2) authenticated caller ID with no caller ID integrity-protected or caller ID spoofed (i.e., negatively authenticated caller ID), or (3) not authenticated caller ID. In this case, the Network X may configure the indication message based on the authenticity information.

4. Apparatuses for Implementing the Aforementioned Methods

Figure 8:
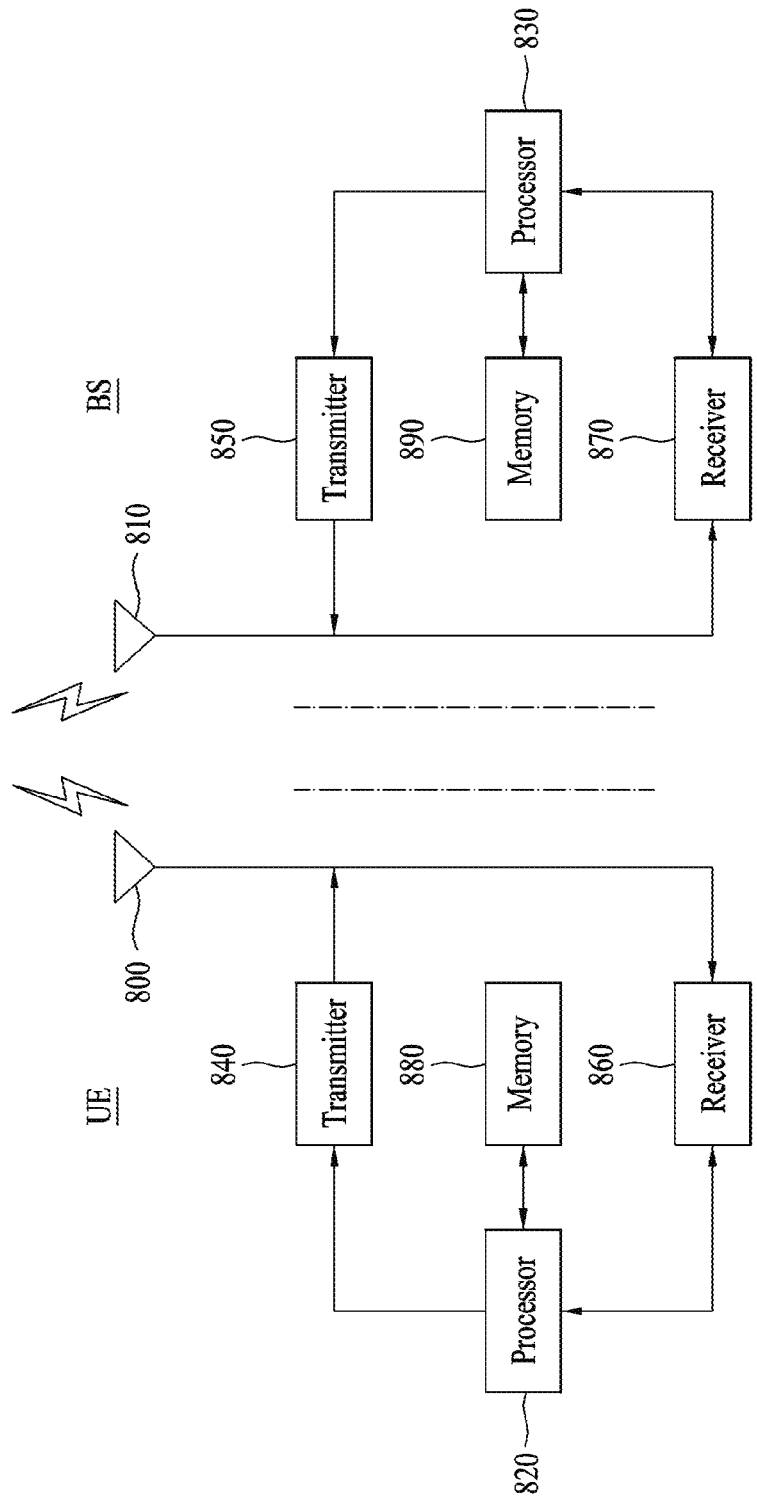
FIG. 8 shows apparatuses for implementing the above-mentioned methods described with reference to FIGS. 1 to 7.

FIG. 8 shows apparatuses for implementing the above-mentioned methods described with reference to FIGS. 1 to 7.

A UE can serve as a transmitter on uplink and as a receiver on downlink. An eNB can serve as a receiver on uplink and as a transmitter on downlink.

The UE and the eNB may include a transmitter 840 and 850 and receiver 860 and 870 for controlling transmission and reception of signal, data and/or messages and antennas 800 and 810 for transmitting and receiving signal, data and/or messages, respectively.

In addition, the UE and the eNB may respectively include processors 820 and 830 for performing the above-described embodiments of the present invention and memories 870 and 890 for storing processing procedures of the processors temporarily or continuously.

The embodiments of the present invention can be performed using the aforementioned components and functions of the UE and the eNB. The apparatuses shown in FIG. 8 may be one of members illustrated in FIGS. 1 and 2.

The processor of the eNB can perform the authentication procedure for verifying the incoming call has been spoofed or not. In addition, the memory of the eNB is able to store the identification information of the UE for verifying the authenticity of the caller ID.

The transmitter 840 and 850 and the receiver 860 and 870 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for notifying authenticity information of a caller identifier (ID) in a wireless access system, the method performed by a first network node and comprising:
receiving, from a second network node, a first call message including a caller ID of a second user equipment (UE2);
determining whether the caller ID of UE2 has been authenticated or not by detecting a trust level of authenticity information in the first call message; and
transmitting, to a first user equipment (UE1), a second call message including the caller ID and an indication message indicating one of authentication levels out of an authenticated, a spoofed, or an unauthenticated level, wherein the authenticated indicates the caller ID is authenticity and the spoofed indicates the caller ID is not guaranteed to correspond to the UE2.

2. The method according to claim 1, wherein the caller ID is a Mobile Station International Subscriber Directory Number (MSISDN) or the caller ID is information representing what is the UE2.

3. The method according to claim 1, wherein the indication message is set to the unauthenticated level when the authenticity information has not been detected or the caller ID is not guaranteed to correspond to the UE2.

4. The method according to claim 1, wherein the level of the authenticated or the spoofed is selected according to the detected authenticity information.

5. The method according to claim 1, wherein the authenticity information is derived by comparing an UE ID with the caller ID of the UE2.

6. The method according to claim 1, wherein the authenticity information indicates multiple level of trust information as one of (1) fully authenticated caller ID with a caller ID integrity protected, (2) authenticated caller ID with no caller ID integrity protected, or (3) not authenticated caller ID.

7. An apparatus for notifying authenticity information of a caller identifier (ID) in a wireless access system, the apparatus comprising:
a receiver;
a transmitter; and
a processor supporting the notifying authenticity information,
wherein the processor is configured to:
receive, via the receiver from a second network node, a first call message including a caller ID of a second user equipment (UE2);
determine whether the caller ID of UE2 has been authenticated or not by detecting authentication information in the first call message; and
transmit, via the transmitter to a first user equipment (UE1), a second call message including the caller ID and an indication message indicating one of authentication levels out of an authenticated, a spoofed, or an unauthenticated level,
wherein the authenticated indicates the caller ID is authenticity and the spoofed indicates the caller ID is not guaranteed to correspond to the UE2.

8. The apparatus according to claim 7, wherein the caller ID is a Mobile Station International Subscriber Directory Number (MSISDN) or the caller ID is information representing what is the UE2.

9. The apparatus according to claim 7, wherein the indication message is set to the unauthenticated level when the authenticity information has not been detected or the caller ID is not guaranteed to correspond to the UE2.

10. The apparatus according to claim 7, wherein the level of the authenticated or the spoofed is selected according to the detected authenticity information.

11. The apparatus according to claim 7, wherein the authenticity information is derived by comparing an UE ID with the caller ID of the UE2.

12. The apparatus according to claim 7, wherein the authenticity information indicates multiple level of trust information as one of (1) fully authenticated caller ID with a caller ID integrity protected, (2) authenticated caller ID with no caller ID integrity protected, or (3) not authenticated caller ID.

* * * * *